United States Patent Office 2,823,200
Patented Feb. 11, 1958

2,823,200

PREPARATION OF VINYL HALIDE POLYMERIZATION PRODUCTS IN GRANULAR FORM

Raymond I. Longley, Jr., and Richard H. Martin, Jr., Springfield, Mass., assignors to Monsanto Chemical Company, St. Louis, Mo., a corporation of Delaware No Drawing. Application August 25, 1955
Serial No. 530,612

9 Claims. (Cl. 260—92.8)

This invention relates to the polymerization of vinyl halide-containing materials. More particularly, this invention relates to the preparation of polymers and copolymers of vinyl halides in granular form.

In one of the customary preparations of vinyl halide-containing polymers, the monomers are polymerized in an aqueous medium containing a dispersing agent to obtain the polymer in the form of small granules which are easily separated from the polymerization medium by filtration. Ideally, the granular polymers so obtained should be of a uniform small size and highly porous in nature so as to readily absorb plasticizers. The presence of large, non-porous, glassy granules is undesirable, since such granules do not readily absorb plasticizer and this frequently leads to heterogeneity in the final product. Such heterogeneity is particularly noticeable when the vinyl halide-containing polymer is calendered into thin films.

Many of the dispersing agents that have been suggested have been subject to certain difficulties. For example, many of the dispersing agents do not give porous granules of the desired small size. With ionic dispersing agents, a serious problem arises in the removal of the dispersing agent from the polymeric material. Certain dispersing agents are undesirable in that they detract from the stability of the polymeric product.

Heteropolymers of vinyl acetate and maleic anhydride have been proposed as dispersing agents in vinyl halide polymerizations. Although such polymers are among the best dispersing agents known to date, they too are subject to certain short-comings. For example, the acetate groups of these dispersing agents are subject to hydrolysis which adversely affects the dispersing properties of the polymer. Other heteropolymers of maleic anhydride with such monomers as styrene, vinyl methyl ether, etc. also have been suggested as dispersing agents in vinyl halide polymerizations, but these heteropolymers give an undesirably large granular polymer, or adversely affect the stability of the vinyl halide-containing polymer or both.

It is an object of this invention to provide an improved process for the preparation of vinyl halide-containing polymers.

Another object of this invention is to provide an improved process for the preparation of vinyl halide-containing polymers in granular form.

Other objects and advantages of this invention will become apparent from the following detailed description thereof.

It has been discovered that granular vinyl halide-containing polymers of consistently excellent quality can be prepared by dispersing and polymerizing the vinyl halide monomer in a dilute aqueous solution of a salt-free interpolymer of ethylene and maleic acid or anhydride, said interpolymer, when in the anhydride form, having a specific viscosity of at least 1.1 as determined at a 1% concentration in dimethylformamide at 25° C. Henceforth, whenever specific viscosities are mentioned, it will be understood that they are determined by this procedure.

The following examples are set forth to illustrate more clearly the principle and practice of this invention to those skilled in the art. All parts are by weight.

EXAMPLE I

Into a glass reaction vessel are charged 125 parts of water, 0.25 part of lauroyl peroxide and 30 parts of a 1% aqueous solution of an ethylene-maleic anhydride interpolymer having a specific viscosity of 1.65. The atmosphere in the reaction vessel is swept free of oxygen with gaseous vinyl chloride monomer and 100 parts of vinyl chloride are charged to the reaction vessel which is then sealed. The sealed glass reaction vessel is rotated end over end at 50° C. for 20 hours at the end of which time the polymerization is complete.

The product has a desirable small particle size with approximately 60% of the particles passing through a 100 mesh screen and only 4% of the polymer particles being retained on a 40 mesh screen. The polymer product readily absorbs plasticizer, has excellent heat and light stability and has good electrical insulating properties.

EXAMPLE II

Several polymerizations are carried out following the procedure outlined in Example I except that only 0.2 part of the ethylene-maleic anhydride interpolymer is employed. The ethylene-maleic anhydride interpolymers employed are of varying molecular weight (indicated by specific viscosity) to determine the effect of polymer molecular weight on efficiency as a dispersing agent. The results are set forth below in Table I.

Table I

| Specific viscosity ethylene-maleic anhydride dispersing agent | Nature of polymer |
|---|---|
| 0.2 | Very coarse and irregular lumps |
| 0.9 | Very coarse and irregular lumps |
| 1.26 | Fine homogeneous powder |
| 1.65 | Fine homogeneous powder |
| 1.85 | Fine homogeneous powder |
| 2.16 | Fine homogeneous powder |

It is seen from the above table that excellent results are obtained when the dispersing agent has a specific viscosity greater than 1.26, but that poor results are obtained when the dispersing agent has a specific viscosity of 0.9 or less. Other data indicate that the dispersing agent must have a minimum specific viscosity of at least about 1.1 if satisfactory results are to be obtained.

EXAMPLES III–VII

Several additional polymerizations are carried out employing the polymerization systems set forth in Table II. All parts are by weight.

Table II

| Example | III | IV | V | VI | VII |
|---|---|---|---|---|---|
| Vinyl Chloride | 100 | 90 | 95 | 100 | 90 |
| Vinyl Acetate | | 10 | | | |
| Diethyl Maleate | | | 5 | | 10 |
| Glyceryl Mono-octadecanoate | 0.1 | | | | 0.1 |
| Dibutyl Phthalate | | | | 5 | |
| Water | 150 | 160 | 150 | 150 | 150 |
| Benzoyl Peroxide | 0.2 | | | 0.2 | |
| Lauroyl Peroxide | | 0.2 | 0.3 | | 0.3 |
| Ethylene-Maleic Anhydride Interpolymer (1) (2) | 0.1 | 0.2 | 0.2 | 0.2 | 0.1 |
| Temperature, °C | 50 | 50 | 50 | 50 | 50 |
| Duration, Hours | 20 | 20 | 20 | 20 | 20 |

(1) Specific viscosity=1.65
(2) Charged as a 1% aqueous solution

Each of the polymers is obtained in a fine granular form and has good electrical insulating properties.

The dispersing agents employed in the present invention may be prepared by dissolving maleic acid or preferably maleic anhydride and a free radical generating catalyst in an aromatic solvent such as benzene and heating under autogenous ethylene pressure in a sealed reaction vessel. The dispersing agents prepared in this manner nearly always contain approximately equimolar proportions of ethylene and maleic acid or maleic anhydride regardless of the particular reaction conditions employed. The maleic acid and maleic anhydride containing interpolymers are equivalents in the practice of the present invention, since on dissolution in water the maleic anhydride groups hydrolyze to the free acid. In the preparation of the dispersing agent, however, it is preferred to employ maleic anhydride because of its greater solubility in the reaction medium and the faster reaction rates that are obtained therewith.

As established in Example II, the interpolymers employed must have a specific viscosity of at least about 1.1, when in the anhydride form, as determined in a 1% solution in dimethylformamide at 25° C. The specific viscosity is determined in accordance with the well known formula:

$$\text{Specific viscosity} = \frac{\text{solution viscosity} - \text{solvent viscosity}}{\text{solvent viscosity}}$$

In a preferred embodiment of the invention, the dispersing agent has a specific viscosity of at least 1.2.

A desirable feature of the present invention is that the interpolymers of ethylene and maleic acid or maleic anhydride are stable in aqueous solutions for long periods of time. Thus, in commercial practice, the ethylene-maleic acid or ethylene-maleic anhydride interpolymers will be dissolved in water to prepare large volumes of concentrated dispersing agent solution which can be stored and used as needed.

Usually only a small concentration of the dispersing agent of this invention is necessary, e. g. 0.005–2.0% and more particularly 0.01–0.5% based on the amount of water used is usually sufficient. The amount of dispersing agent to be used in any particular polymerization system depends upon a number of factors and by controlling the concentration of dispersion agent employed under a given set of polymerization conditions it is possible to obtain the vinyl halide-containing polymer in a controlled, desired particle size. Among the more important parameters which affect the concentration of the dispersing agent to be employed is the water:monomer ratio. Thus, as the water:monomer ratio is increased, the ratio of dispersing agent to water may be decreased if the same average particle size is desired in the polymer. Other factors affecting the amount of dispersing agent to be employed in the polymerization include the particle size desired in the polymer particles and the speed of agitation. Frequently, there is found to be an optimum amount of dispersing agent to be employed for obtaining a minimum particle size and amounts of dispersing agent above or below this optimum amount produce polymers having a larger particle size. It is usually preferred to employ the smallest amount of dispersing agent that will produce polymers of the desired particle size.

Where it is desired to obtain the granular vinyl halide-containing polymer in an extremely fine particle size, it is sometimes desirable to employ certain particle size reducing agents in conjunction with the interpolymer of ethylene and maleic acid or maleic anhydride. Examples of the particle size reducing agents that can be used for this purpose include (1) unsaturated aliphatic carboxylic acids containing from 10 to 20 carbon atoms, (2) hydroxyl group-substituted aliphatic carboxylic acids containing from 10 to 20 carbon atoms, (3) halogen substituted unsaturated aliphatic carboxylic acids having from 10 to 20 carbon atoms and (4) partial esters of polyhydric alcohols and aliphatic carboxylic acids, said alcohols having from 2 to 8 carbon atoms, said acids having from 10 to 20 carbon atoms. Such particle size reducing agents are employed in the amount of about 0.01% to about 5.0%, based on the monomeric materials. The best results are usually obtained with glyceryl monooctadecanoate.

It is sometimes observed that a reduction in particle size is obtained by carrying out the polymerization in the presence of 0.5–15% of certain plasticizers such as (1) dialkyl phthalates in which the alkyl groups contain 2 to 10 carbon atoms, (2) glycol esters of fatty acids, said glycols containing not more than 10 carbon atoms and said fatty acids containing 2 to 9 carbon atoms and (3) phosphoric acid esters of hydroxybenzenes from the group consisting of phenol, cresols and xylenols. The particle size reduction obtained by polymerizing in the presence of these plasticizers is not necessarily additive to that obtained with the use of the particle size reducing agents discussed in the paragraph immediately above.

Except for the particular dispersing agent employed, the polymerizations of the present invention are carried out in the conventional manner. The ratio of water to monomers may vary from 1:1 to approximately 9:1, but is ordinarily set in the range of about 1.5:1. The polymerization initiators employed are normally free radical generating catalysts such as benzoyl peroxide, lauroyl peroxide, ditertiary butyl peroxide, oleyl peroxide, toluyl peroxide and the like.

The process of the present invention is useful in the polymerization of vinyl fluoride, vinyl chloride and vinyl bromide and the copolymerization of such vinyl halides with copolymerizable essentially water-insoluble unsaturated compounds such as vinyl esters of carboxylic acid, for example, vinyl acetate, vinyl propionate, vinyl butyrate, vinyl benzoate; esters of unsaturated acids, for example, methyl acrylate, ethyl acrylate, butyl acrylate, allyl acrylate and the corresponding esters of methacrylic acid; amides, such as acrylic acid amide, acrylic acid analide; nitriles, such as acrylic acid nitrile; vinylidene chloride; trichloroethylene; esters of α,β-unsaturated polycarboxylic acids, for example, the methyl, ethyl, propyl, butyl, amyl, hexyl, heptyl, octyl, allyl and methallyl esters of maleic, itaconic and fumaric acids and the like. Preferably, in the case of copolymerization, a predominate portion, i. e. more than 50% by weight, of the mixture of monomers is a vinyl halide, and especially vinyl chloride.

The above description and particularly the examples are set forth by way of illustration only and it will be obvious that many variations and departures therefrom can be made without departing from the spirit and scope of the invention herein described.

What is claimed is:

1. In a process for preparing polymerization products in granular form, the step which comprises polymerizing an aqueous dispersion of a polymerizable material containing a vinyl halide from the group consisting of vinyl fluoride, vinyl chloride and vinyl bromide in the presence of, as a dispersing agent, an interpolymer of a monomeric mixture consisting of essentially equimolar portions of ethylene and a compound selected from the group consisting of maleic acid and maleic anhydride dissolved in the aqueous phase, said interpolymer being free from salt groups and, when in the anhydride form, having a specific viscosity of at least 1.1 as determined in a 1% solution in dimethylformamide at 25° C.

2. A process as defined in claim 1 in which the polymerizable material is vinyl chloride.

3. A process as defined in claim 1 in which the interpolymer is present in the proportion of 0.005 to 2.0% based on the amount of water.

4. In a process for preparing vinyl chloride-containing polymerization products in granular form, the step which comprises polymerizing an aqueous dispersion containing vinyl chloride, in the presence of 0.005 to 2.0%, based on the water present, of an interpolymer of a monomeric mixture consisting of essentially equimolar portions of ethylene and a compound selected from the group consisting of maleic acid and maleic anhydride dissolved in the aqueous phase, said interpolymer being free from salt groups and, when in the anhydride form, having a specific viscosity of at least 1.1 as determined in a 1% solution in dimethylformamide at 25° C.

5. A process as defined in claim 4 in which an organic peroxide catalyst is present.

6. A process as defined in claim 4 in which lauroyl peroxide is present as a catalyst.

7. In a process for preparing polymerization products in granular form, the step which comprises polymerizing an aqueous dispersion of a mixture of vinyl chloride and an alkyl ester of an $\alpha,\beta$-unsaturated dicarboxylic acid in the presence of, as a dispersing agent, an interpolymer of a monomeric mixture consisting of essentially equimolar portions of ethylene and a compound selected from the group consisting of maleic acid and maleic anhydride, said interpolymer being free from salt groups and, when in the anhydride form, having a specific viscosity of at least 1.1 as determined in a 1% solution in dimethylformamide at 25° C.

8. A process as defined in claim 7 in which the alkyl ester of the $\alpha,\beta$-unsaturated dicarboxylic acid employed is diethyl maleate.

9. In a process for preparing polymerization products in granular form, the step which comprises polymerizing an aqueous dispersion of a mixture of vinyl chloride and vinyl acetate in the presence of, as a dispersing agent, an interpolymer of a monomeric mixture consisting of essentially equimolar portions of ethylene and a compound selected from the group consisting of maleic acid and maleic anhydride, said interpolymer being free from salt groups and, when in the anhydride form, having a specific viscosity of at least 1.1 as determined in a 1% solution in dimethylformamide at 25° C.

References Cited in the file of this patent

UNITED STATES PATENTS

| | | |
|---|---|---|
| 2,476,474 | Baer | July 19, 1949 |

FOREIGN PATENTS

| | | |
|---|---|---|
| 143,031 | Australia | Aug. 22, 1951 |